W. H. ROBBINS.
Hog Trough.
No. 57,772.
Patented Sept. 4, 1866.
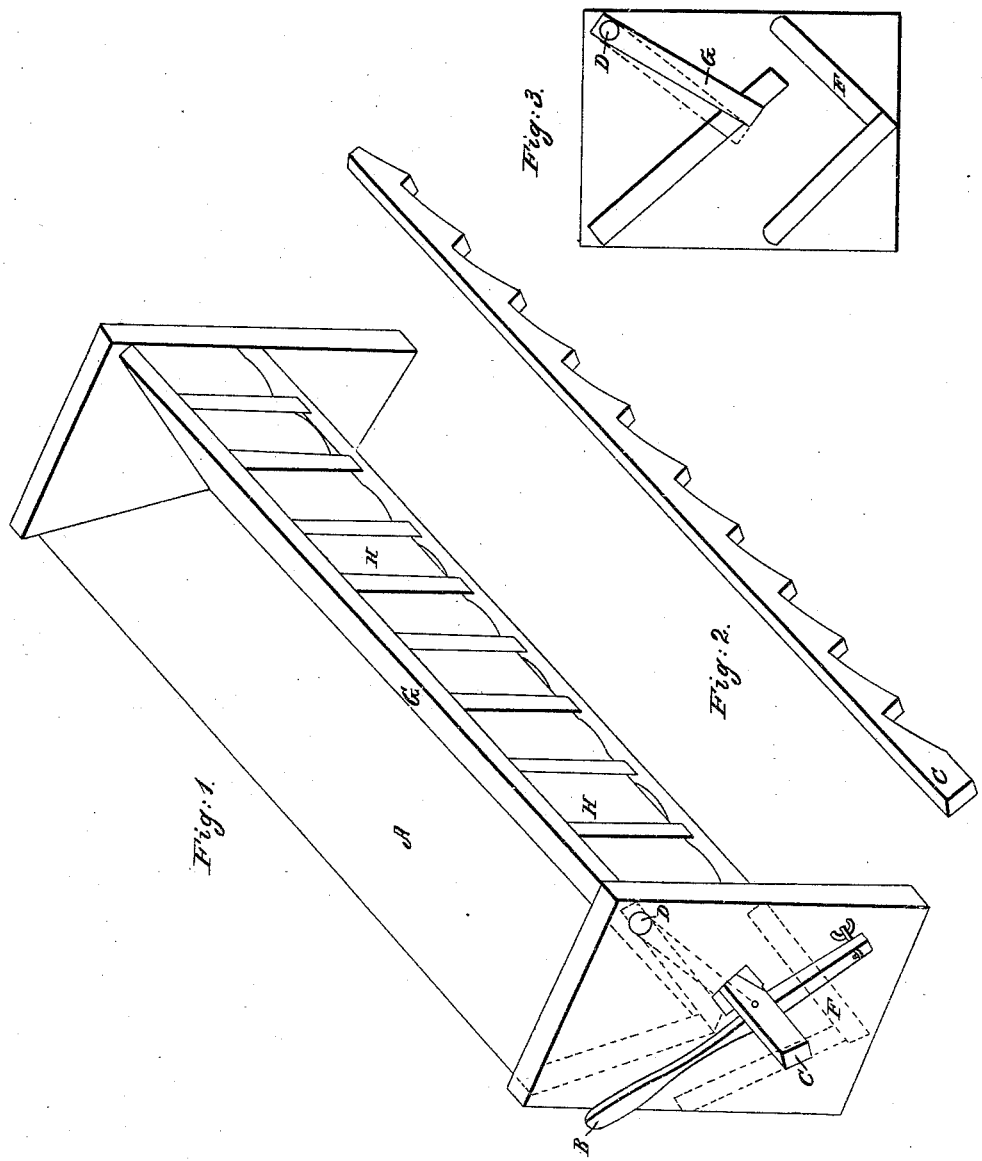

UNITED STATES PATENT OFFICE.

WILLIAM H. ROBBINS, OF RICHMOND, INDIANA.

IMPROVEMENT IN HOG-TROUGHS.

Specification forming part of Letters Patent No. 57,772, dated September 4, 1866.

*To all whom it may concern:*

Be it known that I, WM. H. ROBBINS, of the city of Richmond, Wayne county, Indiana, have invented certain new and useful Improvements in a Hog-Trough; and I do hereby declare the following to be a full, clear, and exact description of the same, reference being had to the drawings which accompany this my specification, and forming a part of the same, and to the letters of reference marked thereon.

The nature of my invention consists in constructing a hog-trough so as to distribute the feed to each hog throughout the length of the trough in equal portions at the same time, and to accommodate the greatest number of hogs in the smallest space.

In the drawings, Figure 1 represents an elevated front view of the trough closed to receive the feed. Fig. 2 represents the key or wedge-bar, by which the trough is opened and closed. Fig. 3 represents the end view, with the trough open, to let the feed fall into each department at the same time.

To enable those skilled in the art to make and use my improved hog-trough, I will proceed to describe the same.

In Fig. 1, A represents a hog-trough, that may be made of any length or size desired, of any suitable material, with one side suspended by pins, as shown at D, Figs. 1 and 3, and allowed to rise and fall, or open and close, as shown in Fig. 3 at G.

In Fig. 3, the lower trough, E, is represented, in which the hogs eat their feed, and by the dotted lines in Fig. 1.

Fig. 2 represents the key or wedge-bar C, that moves in the divisions separating the hogs or stalls, and rests in grooves, so as to allow the side G to open and close, to hold and discharge the feed when and as desired.

B in Fig. 1 represents the lever by which the key or wedge-bar is forced to close the side G or open it.

In Fig. 1, H H show one side of each alternate stall or division closed, and, the opposite side being open, there are no robbing and fighting of the hogs, as each one is alone in his feed, being shut up on the opposite side, which enables me to feed more hogs at one trough than could be if they stood side by side, as they would then crowd each other, and not allow of as many at the same time to eat, their bodies being larger than their heads. In this way I use all the space and not crowd the hogs.

It will be seen that this arrangement affords the means of regulating the feeding of hogs, so as to give each one his equal share, and at the same time, and not crowd him.

Having thus fully described my invention, what I claim as new, and desire to secure by Letters Patent, is—

1. The construction of trough A, with the key or wedge-bar C and lever B, all arranged and operating as described.

2. The equal distribution of the feed to each hog through the length of the trough at the same time and in equal portions.

3. This device of alternating the openings in the side of the trough, that more hogs can be accommodated in the same space than if they were all allowed on one side of the trough at the same time.

4. The manner of constructing the trough so that the hogs cannot get into the feed, and each one be entirely alone in his mess, all operating in the manner and for the purpose substantially as set forth.

WM. H. ROBBINS.

Witnesses:
 T. P. SCHOOLEY,
 W. D. SCHOOLEY.